(12) United States Patent
Van Beek Faletti

(10) Patent No.: US 11,967,213 B2
(45) Date of Patent: *Apr. 23, 2024

(54) METHODS AND SYSTEMS FOR DEMONSTRATING A PERSONALIZED AUTOMATED TELLER MACHINE (ATM) PRESENTATION

(71) Applicant: Capital One Services, LLC, McLean, VA (US)

(72) Inventor: Stephen Van Beek Faletti, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,690

(22) Filed: Apr. 20, 2023

(65) Prior Publication Data

US 2023/0260372 A1    Aug. 17, 2023

Related U.S. Application Data

(63) Continuation of application No. 17/451,328, filed on Oct. 19, 2021, now Pat. No. 11,663,886, which is a (Continued)

(51) Int. Cl.
*G07F 19/00* (2006.01)
*H04W 4/02* (2018.01)
(Continued)

(52) U.S. Cl.
CPC .......... *G07F 19/206* (2013.01); *G07F 19/207* (2013.01); *G07F 19/211* (2013.01);
(Continued)

(58) Field of Classification Search
CPC .... G07F 19/206; G07F 19/207; G07F 19/211; H04W 4/025; H04W 12/06; H04W 12/63; H04W 4/023
See application file for complete search history.

(56) References Cited

U.S. PATENT DOCUMENTS 8,590,782 B1    11/2013  Meek et al.
10,878,668 B1 *  12/2020  van Beek Faletti .. H04W 4/025
(Continued)

FOREIGN PATENT DOCUMENTS

EP          3136275 A1      3/2017

OTHER PUBLICATIONS

R. C. Das, P. P. Purohit, T. Alam and M. Chowdhury, "Location based ATM locator system using OpenStreetMap," The 8th International Conference on Software, Knowledge, Information Management and Applications (SKIMA 2014), 2014, pp. 1-6, doi: 10.1109/SKIMA.2014.7083518. (Year: 2014).

Primary Examiner — Matthew Mikels
(74) Attorney, Agent, or Firm — Bookoff McAndrews, PLLC

(57) ABSTRACT

A computer-implemented method for demonstrating a personalized automated teller machine (ATM) presentation to a user may include: obtaining transaction data of the user via a device associated with the user; obtaining, via the one or more processors, geographic data of the user based on the transaction data; generating, via the one or more processors, ATM data based on the geographic data of the user; obtaining, via the one or more processors, user feedback data based on the ATM data, wherein the user feedback data comprises a selection of an ATM of the list of the ATMs; transmitting, to the selected ATM of the list of the ATMs, presentation data based on the transaction data and the user feedback data; and demonstrating, via the selected ATM of the list of the ATMs, the personalized ATM presentation to the user based on the presentation data.

20 Claims, 4 Drawing Sheets

Related U.S. Application Data continuation of application No. 17/102,485, filed on Nov. 24, 2020, now Pat. No. 11,176,786, which is a continuation of application No. 16/746,122, filed on Jan. 17, 2020, now Pat. No. 10,878,668.

(51) Int. Cl.
  *H04W 12/06* (2021.01)
  *H04W 12/63* (2021.01)

(52) U.S. Cl.
  CPC ........... *H04W 4/025* (2013.01); *H04W 12/06* (2013.01); *H04W 12/63* (2021.01)

(56) References Cited

U.S. PATENT DOCUMENTS

| | | | |
|---|---|---|---|
| 11,176,786 B2* | 11/2021 | Van Beek Faletti | H04W 12/06 |
| 11,663,886 B2* | 5/2023 | Van Beek Faletti | G07F 19/211 |
| | | | 235/379 |
| 2003/0033249 A1 | 2/2003 | Ingram et al. | |
| 2004/0124966 A1 | 7/2004 | Forrest | |
| 2004/0215566 A1 | 10/2004 | Meurer | |
| 2010/0114677 A1 | 5/2010 | Carlson et al. | |
| 2018/0285865 A1 | 10/2018 | Laracey | |

* cited by examiner ized automated teller machine (ATM) presentation. This method and system may enable banks to offer a greater value to customers by creating a more trustworthy and/or familiar appearance for independent ATM services.
METHODS AND SYSTEMS FOR DEMONSTRATING A PERSONALIZED AUTOMATED TELLER MACHINE (ATM) PRESENTATION

CROSS-REFERENCE TO RELATED APPLICATION(S)

This patent application is a continuation of and claims the benefit of priority to U.S. Nonprovisional patent application Ser. No. 17/451,328, filed Oct. 19, 2021, which is a continuation of U.S. Nonprovisional patent application Ser. No. 17/102,485, filed Nov. 24, 2020, which is a continuation of U.S. Nonprovisional patent application Ser. No. 16/746,122, filed on Jan. 17, 2020, the entireties of all of which being incorporated herein by reference.

TECHNICAL FIELD

Various embodiments of the present disclosure relate generally to demonstrating a personalized presentation, and, more particularly, to demonstrating a personalized automated teller machine (ATM) presentation.

BACKGROUND

Customers may generally trust bank-operated ATMs more than ATMs operated by independent ATM services. However, many ATMs in the United States may be operated by independent ATM services, and banks may contract with such independent ATM services in order to provide their customers access to these ATMs (e.g., on a fee-free or reduced fee basis). In many cases, ATMs operated by independent ATM services may be branded generically or with another bank's logo, potentially diminishing trust and creating confusion over whether customers have fee-free or reduced-fee access to these ATMs.

Aspects of the present disclosure may overcome the above-referenced challenge or other challenges. The background description provided herein is for the purpose of generally presenting the context of the disclosure. The materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for demonstrating a personalized automated teller machine (ATM) presentation. This method and system may enable banks to offer a greater value to customers by creating a more trustworthy and/or familiar appearance for independent ATM services.

In an aspect, a computer-implemented method for demonstrating a personalized automated teller machine (ATM) presentation to a user may include obtaining, via one or more processors, transaction data of the user via a device associated with the user, wherein the transaction data includes a potential user activity; obtaining, via the one or more processors, geographic data of the user based on the transaction data, wherein the geographic data of the user includes at least a geographic location associated with the potential user activity; generating, via the one or more processors, ATM data based on the geographic data of the user, wherein the ATM data includes a list of ATMs that are within a predetermined distance of the geographic location of the user; obtaining, via the one or more processors, user feedback data based on the ATM data, wherein the user feedback data includes a selection of an ATM of the list of the ATMs; transmitting, to the selected ATM of the list of the ATMs, presentation data based on the transaction data and the user feedback data, wherein the presentation data includes information regarding a transaction entity associated with the potential user activity; and demonstrating, via the selected ATM of the list of the ATMs, the personalized ATM presentation to the user based on the presentation data.

In another aspect, a computer-implemented method for demonstrating a personalized automated teller machine (ATM) presentation to a user may include activating, via one or more processors, an ATM upon determination of communication between a device associated with the user and the ATM, wherein the device associated with the user is configured to communicate with one or more sensors of the ATM when the device is within a predetermined distance of the ATM; obtaining, via the one or more processors, transaction data of the user, wherein the transaction data includes a potential user activity; transmitting, via the one or more processors, a confirmation request to the device associated with the user, wherein the confirmation request includes a request for a confirmation of the potential user activity; obtaining, via the one or more processors, user feedback data based on the confirmation request, wherein the user feedback data includes at least the confirmation of the potential user activity; transmitting, to the ATM, presentation data based on the transaction data and the user feedback data, wherein the presentation data includes information regarding a transaction entity associated with the potential user activity; and demonstrating, via the ATM, the personalized ATM presentation to the user based on the presentation data.

In yet another aspect, a computer system for demonstrating a personalized automated teller machine (ATM) presentation to a user may include a memory storing instructions; and one or more processors configured to execute the instructions to perform operations. The operations may include obtaining transaction data of the user via a device associated with the user, wherein the transaction data includes a potential user activity; obtaining geographic data of the user based on the transaction data, wherein the geographic data of the user includes at least a geographic location associated with the potential user activity; generating ATM data based on the geographic data of the user, wherein the ATM data includes a list of ATMs that are within a predetermined distance of the geographic location of the user; obtaining user feedback data based on the ATM data, wherein the user feedback data includes a selection of an ATM of the list of the ATMs; transmitting, to the selected ATM of the list of the ATMs, presentation data based on the transaction data and the user feedback data, wherein the presentation data includes information regarding a transaction entity associated with the potential user activity; and demonstrating, via the selected ATM of the list of the ATMs, the personalized ATM presentation to the user based on the presentation data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," and other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data, such as transaction data, geographic data, ATM data, user feedback data, or presentation data, may be used to demonstrate a personalized automated teller machine (ATM) presentation to a user.

Figure 1:
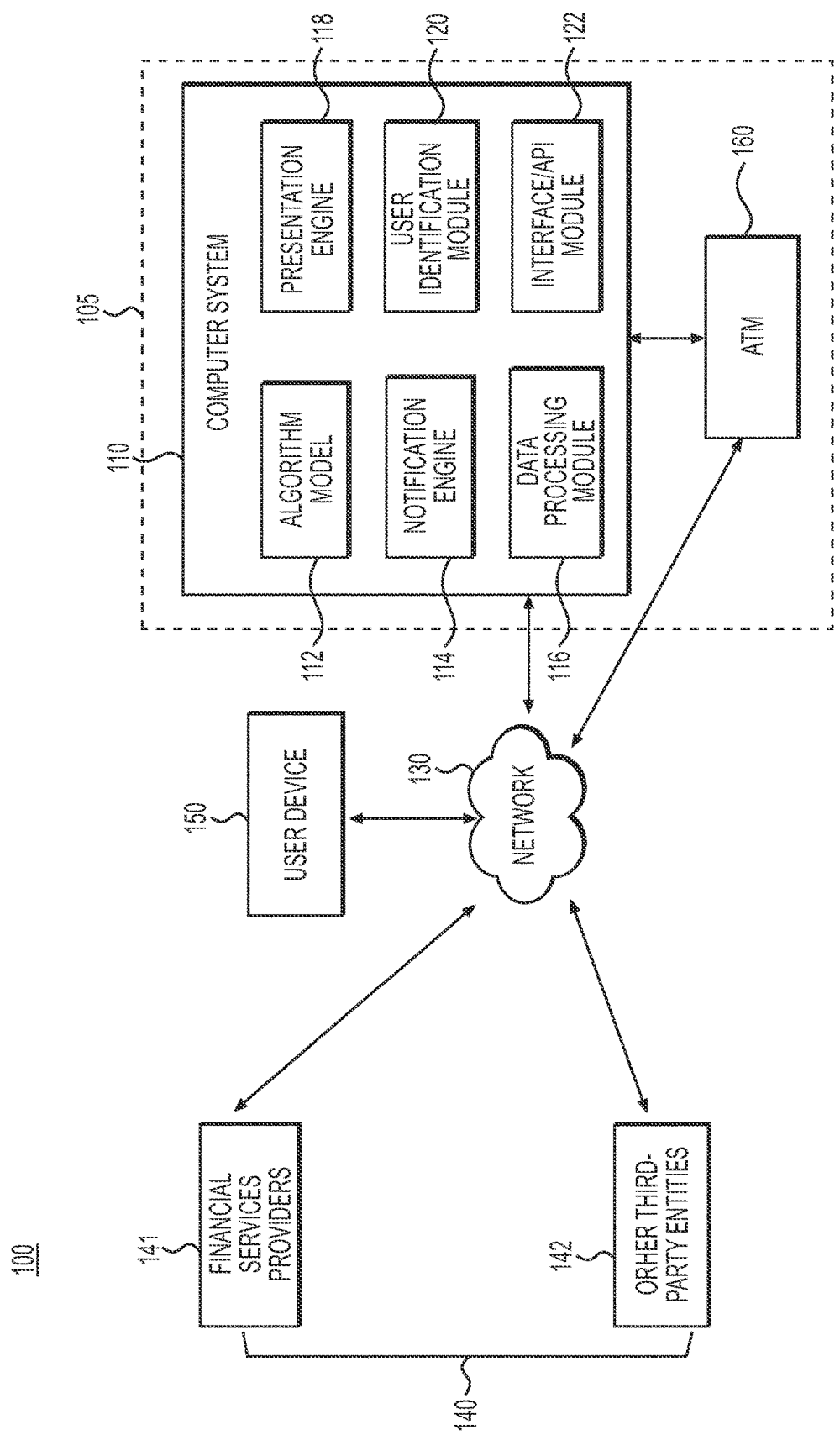
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data 140 (e.g., transaction data, geographic data, ATM data, etc.), a user device (or a device associated with a user) 150, and an ATM 160. The one or more resources for collecting data 140 may include financial services providers 141 or other third-party entities 142. These components may be connected to one another via the network 130.

The computer system 110 may have one or more processors configured to perform methods described in this disclosure. In some embodiments, the computer system 110 may be owned, operated, and/or maintained by, e.g., a financial services provider 141 or another third-party entity 142. The computer system 110 may include one or more modules, models, or engines. The one or more modules, models, or engines may include an algorithm model 112, a notification engine 114, a data processing module 116, a presentation engine 118, a user identification module 120, and/or an interface/API module 122, which may each be software components stored in/by the computer system 110. The computer system 110 may be configured to utilize one or more modules, models, or engines when performing various methods described in this disclosure. In some examples, the computer system 110 may include a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, one or more modules, models, or engines may be separated into separate, more numerous modules, models, or engines. In some embodiments, some of the one or more modules, models, or engines may be removed while others may be added.

The algorithm model 112 may include one or more algorithm models. The algorithm model 112 may include a trained machine learning model. Details of the algorithm model 112 are described elsewhere herein. The notification engine 114 may be configured to generate and communicate (e.g., transmit) one or more notifications (e.g. ATM data, a confirmation request, or user feedback data) to a user device 150 or to one or more resources 140 via the network 130. The data processing module 116 may be configured to monitor, track, clean, process, or standardize data (e.g., transaction data, ATM data, user feedback data, etc.) received by the computer system 110. One or more algorithms may be used to clean, process, or standardize the data. The presentation engine 118 may receive data or results (e.g., presentation data) from the algorithm model 112 and demonstrate the personalized ATM presentation based on the data or results. The user identification module 120 may manage or authenticate identification data for each user accessing the computer system 110. In one implementation, the transaction data, geographic data, ATM data, user feedback data, or presentation data associated with each user may be stored to, and retrieved from, one or more components of the data storage associated with the computer system 110 or the one or more resources 140. Details of the transaction data, geographic data, ATM data, user feedback data, and presentation data are described elsewhere herein. The interface/API module 122 may allow the user to interact with one or more modules, models, or engines of the computer system 110.

The computer system 110 may be configured to receive data from other components (e.g., the one or more resources 140, the user device 150, and/or the ATM 160) of the system environment 100 via the network 130. The computer system 110 may further be configured to utilize the received data by inputting the received data into the algorithm model 112 to produce a result (e.g., a delivery status). Information indicating the result may be transmitted to the user device 150 or the one or more resources 140 over the network 130. In some examples, the computer system 110 may be referred to as a server system that provides a service including providing the information indicating the received data and/or the result to the one or more resources 140 or the user device 150.

The network 130 may be any suitable network or combination of networks and may support any appropriate protocol suitable for communication of data to and from the computer system 110 and between various other components in the system environment 100. The network 130 may include a public network (e.g., the Internet), a private network (e.g., a network within an organization), or a combination of public and/or private networks. The network 130 may be configured to provide communication between various components depicted in FIG. 1. The network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network 130 may be implemented using cell and/or pager networks, satellite, licensed radio, or a combination of licensed and unlicensed radio.

The financial services providers 141 may include one or more entities such as banks, credit card issuers, merchant services providers, or other type of financial service entities. In some examples, the financial services providers 141 may include one or more merchant services providers that provide merchants with the ability to accept electronic payments, such as payments using credit cards and/or debit cards. Therefore, the financial services providers 141 may collect and/or store data pertaining to transactions occurring at the merchants. In some embodiment, the financial services providers 141 may issue transaction vehicles (e.g., a financial card) to the user. In some embodiments, the financial services providers 141 may provide a platform (e.g., an app on a user device) displayed on a user device that can present or display data (e.g., ATM data) to a user. The financial services providers 141 may include one or more databases to store any information related to the transaction or the user. In some embodiments, the financial services providers 141 may provide a platform (e.g., an application) on a user device 150 with which a user can interact. Such user interactions may provide data (e.g., user feedback data) that may be analyzed or used in the method disclosed herein.

Other third-party entities 142 may include any entity that is not a financial services provider 141. For example, the other third party entities 140 may include, e.g., manufacturers, retailers, consumer promotion agencies, and other entities. In some embodiments, the other third-party entities 140 may include or provide on-line resources including webpage, e-mail, apps, or social network sites. In some embodiments, the other third-party entities 142 may include a merchant. The other third-party entities 142 may include merchants that provide one or more products. The term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, or other type of entity that provides products that a consumer may consume. A merchant may include, own, or operate one or more venues that a consumer may physically visit in order to obtain the products (goods or services) offered by the merchant. In some embodiments, the other third-party entities 142 may include one or more independent ATM services. In some embodiment, the other third-party entities 142 may issue transaction vehicles (e.g., a financial card) to a user. In some embodiments, the other third-party entities 142 may provide a platform (e.g., an app on a user device) displayed on a user device that can present or display data (e.g., ATM data) to a user. The other third-party entities 142 may include, own, and/or operate one or more databases to store any information related to transaction vehicles that they provide, and/or any information related to a user of the transaction vehicles that they provide. In some embodiments, the other third-party entities 142 may provide a platform (e.g., an app on a user device) with which a user can interact. Such user interactions may provide data (e.g., user feedback data) that may be analyzed or otherwise used according to methods disclosed herein.

The financial services providers 141 and/or any other third-party entities 142 may each include one or more computer systems configured to gather, process, transmit, and/or receive data. In general, whenever any of the financial services providers 141 and/or other third-party entities 142 is described as performing an operation of gathering, processing, transmitting, or receiving data, it is understood that such operations may be performed by a computer system thereof. In general, a computer system may include one or more computing devices, as described in connection with FIG. 4 below.

The user device 150 may operate a client program, also referred to as a user application or third-party application, used to communicate with the computer system 110. This user application may be used to provide information (e.g., user feedback data) to the computer system 110 and to receive information from the computer system 110. In some examples, the user application may be a mobile application that is run on the user device 150. The user device 150 may be a mobile device (e.g., smartphone, tablet, pager, personal digital assistant (PDA)), a computer (e.g., laptop computer, desktop computer, server), or a wearable device (e.g., smart watch). The user device 150 can also include any other media content player, for example, a set-top box, a television set, a video game system, or any electronic device capable of providing or rendering data. The user device 150 may optionally be portable. The user device 150 may optionally be handheld. The user device 150 may be a network device capable of connecting to a network, such as the network 130, or other networks such as a local area network (LAN), wide area network (WAN) such as the Internet, a telecommunications network, a data network, or any other type of network. The user device 150 may be capable of transmitting information indicating a current location of the user device 150. For example, the user device 150 may have an application configured to transmit data indicating a current location of the user device 150 to the computer system 110. The user device 150 may determine a location thereof based on data obtained by a GPS included in the user device 150 and/or other location estimation techniques. The computer system 110 may transmit or receive information from the user device 150 based on the location of the user device 150.

The automated teller machine (ATM) 160 may be an electronic telecommunications device that enables customers or users of financial services providers (e.g., the financial services providers 141) to perform financial transactions, such as cash withdrawals, deposits, transferring funds, and/or obtaining account information. The ATM 160 may collect data of the user through one or more components associated with the ATM 160. The ATM 160 may also perform one or more operations (e.g., demonstrating a personalized ATM presentation). Details of the ATM 160 and one or more components thereof are described elsewhere herein.

The computer system 110 and the ATM 160 may be owned, operated, or otherwise be part of an entity 105, which may be any type of company, organization, or institution. In some examples, the entity 105 may be a financial services provider. In such examples, the computer system 110 may have access to data pertaining to transactions through a private network within the entity 105. For example if the entity 105 is a card issuer, the entity 105 may collect and store data (e.g., identification data, transaction data) involving a credit card or debit card issued by the entity 105. In such examples, the computer system 110 may still receive data from other financial services providers 141. In some cases, the computer system 110 may have access to data collected by the ATM 160. In some embodiments, the computer system 110 may be associated with or located within the ATM 160.

Figure 2:
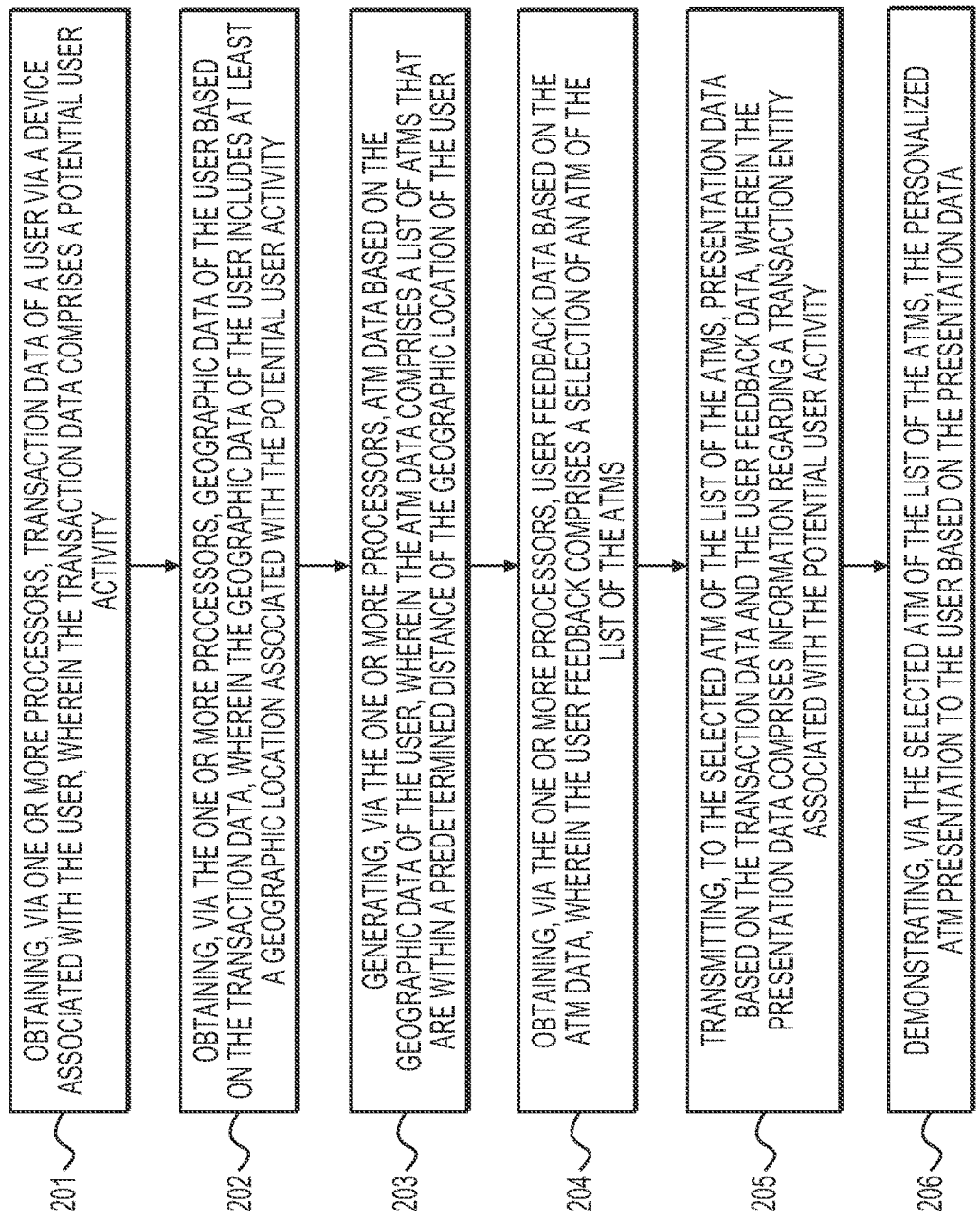
FIG. 2 depicts a flowchart of an exemplary method of demonstrating a personalized automated teller machine (ATM) presentation to a user, according to one or more embodiments.

FIG. 2 is a flowchart illustrating a method for demonstrating a personalized automated teller machine (ATM) presentation to a user, according to one or more embodiments of the present disclosure. Some or all of the method may be performed by, e.g., the computer system 110. In some embodiments, some or all of the method may be performed by, e.g., a user device (e.g., a user device 150), and/or by an ATM.

Step 201 may include obtaining, via one or more processors, transaction data of a user via a device associated with the user. The transaction data may include information regarding a transaction entity associated with the user. For instance, the user may turn on or otherwise activate the device associated with the user and/or access a third-party application provided by the transaction entity. In this situation, the process of obtaining the transaction data may be initiated. The information regarding the transaction entity may include, but is not limited to, a name, an identifier (e.g., bank identification number), a location, and/or a characteristic of the transaction entity. The characteristic of the transaction entity may include, e.g., a revenue, a net profit, an employee number, and/or any financial or product information of the transaction entity. The transaction entity may include at least one of a financial services provider (e.g., a financial services provider 141), or a third-party entity (e.g., a third party entity 142), such as an on-line resource, or a merchant. Details of the financial services provider and the third-party entity are described elsewhere herein. The transaction data may also include information regarding a relationship between the user and the transaction entity. In some embodiments, the relationship between the user and the transaction entity may include that the user is a customer of the transaction entity. In this situation, the user may hold a transaction vehicle (e.g., financial card or code) issued by the transaction entity or register with the transaction entity. In some embodiments, the relationship between the user and the transaction entity may include that the user is not a customer of the transaction entity. In this situation, the user may not hold a transaction vehicle (e.g., financial card) issued by the transaction entity nor be registered with the transaction entity.

The transaction data of the user may include any information regarding a transaction performed by the user, for example, user preferences (preferences or reviews regarding favorite products and/or services, favorite department stores, etc.), a transaction amount, or previous transaction data. The previous transaction data may include, e.g., a time of a transaction, a location of a transaction, past spending levels, a frequency of shopping at one or more transaction entities, store loyalty exhibited by the user, how much the user spends in an average transaction, how much the user has spent on a particular good or goods, and/or how often the user transacts with a particular transaction entity.

The transaction data may include a potential user activity. The potential user activity may include an activity potentially to be performed by the user via the ATM. The potential user activity may include, e.g., at least one of depositing funds, withdrawing funds, or changing identification data of the user. Generally, the potential user activity may include any transaction activity that can be performed by the user via the ATM or not via the ATM. For instance, the potential user activity may include transferring funds from one financial account to another, sending funds to other customers or transaction entities, or dividing funds into different portfolios. In one example, the user may want to deposit some funds into one of the user's financial accounts. In this situation, the potential user activity may be depositing funds by the user via the ATM. In another example, the user may want to change a password associated with one of the user's financial accounts. In this situation, the potential user activity may be changing a password by the user via the ATM. Such potential user activity may be obtained when the user turns on the device associated with the user and access a third-party application provided by the transaction entity or associated with the ATM. For instance, the user may turn on the device, and access a third-party application that provides the user with information regarding where, when and how to deposit funds. In this situation, the potential user activity may be depositing funds by the user via the ATM.

The transaction data may, in some embodiments, include identification data of the user. The identification data of the user may include at least one of a password, a username, or an address of the user. The identification data of the user may further include an actual name, contact information (e.g., phone numbers, e-mail addresses, etc.), a social security number, biometric data, and/or additional information pertaining to the user. The additional information may include user preference information, demographic information (e.g., age, gender, marital status, income level, educational background, number of children in household, etc.), employment, and/or other data related to the user. The biometric data of the user may include, e.g., any information related to human characteristics of the user. The biometric data may include, for example, physiological information such as a fingerprint, palm veins, face recognition, DNA, palm print, hand geometry, iris recognition, retina or odor/scent. The biometric data may also include behavioral characteristics related to the pattern of behavior of the user, including but not limited to typing rhythm, gait, or voice.

Step 202 may include obtaining, via the one or more processors, geographic data of the user based on the transaction data. The geographic data of the user may include at least a geographic location associated with the potential user activity and/or the user. Such geographic location may include a specific address of the potential user activity or the user, or a geographic region surrounding the potential user activity or the user. In one example, if the potential user activity (e.g., depositing funds via an ATM) may take place at a specific address (e.g., a grocery store having the ATM), the geographic location may be within a region or a radius around the specific address. In this situation, the radius or region may be set by the user, another individual, or by one or more algorithms. For instance, in some embodiments, the user may select a pre-determined distance as the radius around a specific address. Such pre-determined distance may be at least 10 meters, 20 meters, 30 meters, 40 meters or more around the specific address. In some embodiments, the pre-determined distance may be at most 40 meters, 30 meters, 20 meters, 10 meters, or less around the specific address. The geographic location may include a geographic region that a user travels to perform a potential user activity. For instance, a user may go to work in the morning, go to gym after work, and go back home, and may typically perform the potential user activity near the user's residence, location of employment, or gym. In this situation, the geographic location may be considered the geographic area encompassed within a radius around the center of the user's residence, gym, and/or employer location.

Step 203 may include generating, via the one or more processors, ATM data based on the geographic data of the user. The ATM data may include, e.g., a list of ATMs that are within a predetermined distance of the geographic location of the user. The step of generating the ATM data based on the geographic data of the user may include identifying a geographic location of the potential user activity or the user. Identifying the geographic location of the potential user activity or the user may include using, or using data from, a user device associated with the user (e.g., the user device 150). In some embodiments, for example, the user device 150 may include memory storage that stores (e.g., periodically) a geographic location of the potential user activity or the user. The geographic location of the potential user activity may include a current location of the user and/or a location that the user visits or stays regularly. Bounds (e.g., a radius or area) of the geographic location of the potential user activity or the user may be set by the user or another individual, or may be determined by an algorithm. For example, a predetermined radius of the geographic location of the potential user activity or the user may be at least 10 meters (m), 15 m, 20 m, 25 m, 30 m, 35 m, 40 m, or more. In some other embodiments, the predetermined radius may be at most 40 m, 35 m, 30 m, 25 m, 20 m, 15 m, 10 m or less.

The ATM data may further include geographic locations of the list of ATMs that are within the predetermined distance of the geographic location of the potential user activity or the user. Such geographic locations may include specific addresses of ATMs, and/or may include geographic regions surrounding each ATM of the list of ATMs. For instance, if one ATM is at a specific address (e.g., a grocery store having the ATM), the geographic location of the ATM may include a region or a radius around the specific address. The geographic locations of the ATMs may be shown on user interface display on a display screen of the user device. The ATM data may further include any information regarding an ATM, or any transaction that may be performed by the user with an ATM. Such information may include, but is not limited to, a specific location of the ATM, a characteristic of the ATM (e.g., which financial services provider owns the ATM), previous transactions or user activities performed via the ATM, a status of the ATM (e.g., out of order), or a functionality of the ATM (e.g., only for withdrawing or depositing funds).

Step 204 may include obtaining, via the one or more processors, user feedback data based on the ATM data. In some embodiments, the user feedback data may include a selection of an ATM of the list of the ATMs. In some embodiments, the user feedback data may indicate a user's preference of a given ATM listed in the list of ATMs. For instance, the user may be presented with a list of the ATMs via a display of the device associated with the user (e.g., user device 150), and the user feedback data may include at least one ATM selected by the user among the list of ATMs. In some embodiments, the user feedback data may be received and transmitted to a trained machine learning algorithm (e.g., a neural network) to tune and/or update the trained machine learning algorithm towards user behavior or preference. In some embodiments, the user feedback data may be provided by the user via one or more interactive activities of the user with one or more interactive components of the user device. The one or more interactive activities may include clicking on or touching an image, link, or button displayed on a display of the device associated with the user. The device associated with the user may be capable of accepting inputs of a user via one or more interactive components of the user device, such as a keyboard, button, mouse, touchscreen, touchpad, joystick, trackball, camera, microphone, or motion sensor input (e.g., an input device 450 as described in connection with FIG. 4, below). One or more user interfaces (e.g., an app) may interact with the user to collect the user feedback data. For instance, the user may click on, touch, verbally indicate, or otherwise indicate one or more selections regarding the ATMs displayed on a display of the user device. The one or more selections may be in a form of a link, button, hyperlink, list selection, image, or any other form.

In some embodiments, the step of obtaining user feedback data may be based on motion, movement, or relocation of a user device (e.g., the user device 150) towards or into a geographic location, such as a geographic location of an ATM. For example, a user device may broadcast, transmit, detect, or indicate that it has moved into a geographic location of an ATM (e.g., either internally or via the network 130), which may serve to indicate the user's preference for that ATM. In some embodiments, a computer system (e.g., a computer system 110) remote from an ATM may receive such an indication, transmission, or broadcast from a user device. In some embodiments, a computer system local to an ATM, or an ATM itself, may receive such an indication, transmission, or broadcast from a user device.

Step 205 may include transmitting, to the selected ATM of the list of ATMs, presentation data based on the transaction data and/or the user feedback data. Additionally or alternatively, step 205 may include simply loading, at the selected ATM, presentation data based on the transaction data and/or the user feedback data. Such presentation data may be stored locally at the selected ATM, or may be transmitted to the selected ATM from one or more local or remote computers. The presentation data may include, e.g., information regarding a transaction entity associated with the potential user activity. The information regarding the transaction entity may include, but is not limited to, a name, an identifier (e.g., bank identification number), a location, a trademark, a logo, a graphical display, or a characteristic of the transaction entity, or an audio or visual output associated with the transaction entity (e.g., an animation, a still image, or a noise such as a jingle, tune, or tone). The characteristic of the transaction entity may include, e.g., a branch number, a fee, a size (e.g., a number of customers), revenue, a net profit, an employee number, or any financial or product information related to the transaction entity. The transaction entity may include at least one of a financial services provider (e.g., a financial services provider 141) or another third-party entity (e.g., a third-party entity 142, such as an on-line resource, or a merchant). Details of the financial services provider or other third-party entity are described elsewhere herein. The presentation data may also include information regarding a relationship between the user and the transaction entity. Details of such relationship are described elsewhere herein.

Prior to step 205, or at any stage of demonstrating a personalized ATM presentation to a user, the method may include determining the presentation data based on transaction data (e.g., identification data) of the user. Determining the presentation data may be initiated when the transaction data of the user is received or obtained. Determining the presentation data of the user may include comparing the obtained transaction data of the user to pre-stored identification data. Such pre-stored identification data may be associated with or mapped to pre-stored presentation data. One or more algorithms may be used to compare the obtained transaction data of the user to pre-stored identification data and determining whether there is a match (e.g., a complete match or a match equal to or exceeding a predetermined threshold of similarity) between the obtained transaction data of the user and the pre-stored identification data. Pre-stored presentation data associated with the pre-stored identification data may be obtained as the presentation data, based on whether there is a match (e.g., a complete match or a match equal to or exceeding a predetermined threshold of similarity) between the obtained transaction data of the user and pre-stored identification data. Pre-stored presentation data and/or pre-stored identification data may be stored at, e.g., an ATM (e.g., at a computer system housed within an ATM), or may be stored at any location locally or remotely including a computer system (e.g., a computer system 110) that may communicate with the ATM and/or a user device via a wired or wireless connection (e.g., over a network connection).

In some embodiments, the step of determining the presentation data may include receiving the presentation data, or receiving a cue to upload or retrieve the presentation data, via one or more communication components associated with the ATM 160. The one or more components associated with the ATM 160 may include, e.g., a reader (e.g., card reader), one or more ATM processors, a keypad, a display screen, a speaker, a printer, one or more sensors, a presentation component, a wired and/or wireless connection, and/or a biometric capturing device. The reader may, e.g., read account information that is stored on a magnetic strip or a chip on a card or that is shown on a display of a user device. The one or more ATM processors may be configured to receive, process, or analyze and/or interpret the received data (e.g., presentation data). The keypad may, e.g., allow the user to input the identification data (e.g., password), select what type of transaction they want to make, adjust a user interface, and communicate with the one or more ATM processors. The display screen may, e.g., allow the user to see each step of the process or transaction. The display screen may also or alternatively include one or more interactive components that the user can interact with to complete a transaction. The speaker may, e.g., capture the user's voice or allow the user to hear additional voice features of the ATM. The printer may, e.g., be configured to print a receipt, a confirmation, or another document to aid in completion of a transaction and/or to otherwise interact with a user. The one or more sensors may include, e.g., a proximity sensor, a radio-frequency identification tag, or a magnet to capture signals from the card, a device associated with the user (e.g., user device), the user, or another item or individual. The user device may communicate with the one or more sensors through, e.g., a near-field communication (NFC), radio-frequency identification (RFID), or Bluetooth connection, or by any other wired or wireless connection. The presentation component may, e.g., be able to present the personalized ATM presentation to individuals who can observe the ATM, such as the user or other bystanders. Such presentation component may include, e.g., one or more lights, screens, projectors, or speakers that can show or emit personalized ATM presentation, when the user is (or even when the user is not) within a predetermined distance from the ATM (e.g., within a geographical location including the ATM). The wired or wireless connection may include, e.g., any devices, hardware, software, and/or attachment(s) to enable aspects to enable the ATM to communicate with, e.g., a remote server, a cloud computing system, a local computer, and/or the user device. The biometric capturing device may be configured to capture, e.g., any biometric information (e.g., fingerprint, facial image) from a user.

Step 206 may include demonstrating, via the selected ATM of the list of the ATMs, the personalized ATM presentation to the user based on the presentation data. "Demonstrating" in this context may include visual and/or auditory demonstration using one or more screens, lights, displays, and/or speakers on, near, and/or controlled by the ATM. For example, in some embodiments, an ATM may include one or more screens or displays incorporated into its external casing, on top of it, and/or nearby, any or all of which may be used to demonstrate a personalized ATM presentation. The personalized ATM presentation may include, e.g., at least one of a logo, a theme, a color scheme, a slogan, a title screen, a jingle, tone, or other sound, or any other output associated with the transaction entity. Such a personalized ATM presentation may be presented to the user via any presentation component(s) of the ATM. The personalized ATM presentation may include, e.g., at least a design, a layout, a graphic scheme, or a color scheme of the personalized ATM presentation. In some embodiments, the step of demonstrating the personalized ATM presentation to the user based on the presentation data may include receiving such presentation data from the transaction entity; thus, in such embodiments, the presentation data may be provided by the transaction entity. The design of the personalized ATM presentation may include, e.g., a background (e.g., the shape of the background or whether the logo of the transaction entity shows up on the background) of the personalized ATM presentation. The layout of the personalized ATM presentation may include, e.g., an arrangement of texts, graphics, a logo or a theme associated with the transaction entity. The graphic scheme of the personalized ATM presentation may include, e.g., a shape or design of a logo or a theme associated with the transaction entity. The shape of a logo or a theme associated with the transaction entity may include, e.g., any two-dimensional or three-dimensional shape, including, but not limited to, a circle, a square, a rectangle, a triangle, a trapezoid, a pentagon, a sphere, a cone, a cylinder, a cube, or a cuboid. The color scheme of the personalized ATM presentation may include, e.g., any color(s) associated with the background, the logo or the theme associated with the transaction entity on the presentation. Such color(s) may include any suitable shade or hue, such as black, white, yellow, red, pink, green, blue, gray, orange, purple, gold, silver, or brown.

In some embodiments, the step of demonstrating the personalized ATM presentation to the user may include demonstrating the personalized ATM presentation via an augmented reality (AR) device or a virtual reality (VR) device. The AR device may include a wearable glass device or a head-mounted device which, in some cases, may include or may be part of a user device. The VR device may include, e.g., a virtual reality headset, which may be a head-mounted device that provides virtual reality for the wearer. The AR device or VR device may include, e.g., a stereoscopic head-mounted display (providing separate images for each eye), stereo sound, head motion tracking sensors (e.g., which may include gyroscopes, accelerometers, magnetometers, structured light systems, etc.), and/or eye tracking sensors. The AR device or the VR device may be equipped by the user. The AR device or the VR device may include one or more processors or components (e.g., sensors) that are able to communicate with the ATM (and/or a user device, if the AR or VR device does not include a user device). Such communication may be initiated once the personalized ATM presentation is generated, or once the presentation data is determined. Such communication may be available, e.g., when the distance between the user and the ATM is within a pre-determined distance. Such pre-determined distance may be at least 5 meters, 10 meters, 20 meters, 30 meters, 40 meters or more. In some embodiments, the pre-determined distance may be at most 40 meters, 30 meters, 20 meters, 10 meters, 5 meters, or less. In one example, the user, who is wearing a VR device, may activate a device to search for an ATM to deposit fund. After the user feedback is entered by the user and one ATM is selected, one or more components of the ATM may provide signal or data that can communicate with the one or more processors or components of the VR device to activate the VR device. In this situation, the user may see a personalized ATM presentation of the ATM via the VR device that the user is wearing.

In some embodiments, multiple users may see different personalized ATM presentations on the same ATM, e.g., due to the use of AR or VR device. For instance, user A and user B are next to each other and each wears a VR device. Both of them may activate their devices to search for an ATM to deposit funds. After the user feedback data is received from both user A and user B and one ATM is selected by both users, one or more components of the ATM and/or a computer system associated with the ATM may provide a signal or data that can communicate with the one or more processors or components of the VR devices worn by user A and user B to activate their VR devices. In this situation, user A may see a personalized ATM presentation of the ATM via the VR device that the user A is wearing, and, at the same time, user B may see another personalized ATM presentation of the ATM via the VR device that the user B is wearing.

In further embodiments, the step of demonstrating a personalized ATM presentation to a user may include simultaneously demonstrating two personalized ATM presentations to two users, or to a user associated with two or more separate accounts or transaction entities. For example, two sets of logos, institution names, color schemes, etc. may be demonstrated side-by-side or in sequence using a display, light sequence, speaker, or other output of an ATM.

In some embodiments, the one or more resources 140 (e.g., the one or more financial services providers 141) may bid to have a personalized ATM presentation featuring a logo, institution name, color scheme, etc. corresponding to the resource displayed on an ATM, e.g., as an advertisement and/or for a brand awareness campaign. A resource offering a highest bid may win the ability to display its personalized ATM presentation on the ATM for a certain period of time. One or more algorithms and/or an automated auction platform may be used for the one or more resources 140 to bid for displaying a given personalized ATM presentation. Such an algorithm and/or automated auction platform may be hosted, run, and/or managed by a computer system otherwise associated with systems and methods disclosed herein (e.g., the computer system 110), and/or any other suitable computer system with a direct or indirect connection to the ATM, via, e.g., the network 130. The algorithm and/or automated auction platform may enable the one or more resources 140 to set bidding parameters in order to bid. The bidding parameters may include a maximum bidding amount (e.g., maximum is set as $1000) that a given resource is willing to pay, a bidding period (e.g., three hours) that a given resource is willing to stay in the bidding process, and/or a bidding increment (e.g., a constant increment, such as $10, or a variable increment that changes based on, e.g., a percentage value and/or an algorithm) by which the given resource is willing to increase a bid against a competing bid. In one example, a plurality of commercial banks may participate in a bidding process, and each may submit a maximum bidding amount, a bidding period, and a bidding increment to a computer system managing the bidding process. The one or more algorithms and/or the automated auction may utilize the maximum bidding amounts, the bidding periods, and the bidding increments to perform the bidding process and determine a winner. A personalized ATM presentation provided by the winning commercial bank may be presented on the ATM for a predetermined period of time.

Prior to step 202, or at any stage of generating a personalized ATM presentation to a user, there may be a step of authenticating identification data of the user. The authenticating step may be initiated, e.g., when the identification data of the user is received or obtained. Authentication may include, e.g., comparing the identification data of the user to pre-stored identification data. During the authenticating process, one or more algorithms may be used to compare the identification data of the user to a pre-stored identification data and determine whether there is a match (e.g., a complete match or a match equal to or exceeding a predetermined threshold of similarity) between the identification data of the user and pre-stored identification data. Transaction or demonstrating process may be permitted to be completed, may be stopped, or may require additional authentication processes to occur, based on whether there is a match (e.g., a complete match or a match equal to or exceeding a pre-determined threshold of similarity) between the identification data of the user and pre-stored identification data.

The pre-stored identification data may be initially generated, e.g., when a user is first registered with a transaction system, an authentication system, or a transaction entity. In other embodiments, the pre-stored identification data may be first generated, e.g., when a user first connects with a transaction system, an authentication system, or a transaction entity via a transaction vehicle (e.g., a user device) or in-person at a physical location of the transaction system, the authentication system, or the transaction entity. If the user device is used and the user device is an electronic mobile device, the pre-stored identification data may be first generated when a mobile application for authenticating identification is downloaded, installed, or running on the user device for the first time. If another type of transaction vehicle is used, the pre-stored identification data may be generated when information of the transaction vehicle is registered or entered by a user through an electronic device (e.g., a phone, a computer, etc.). The pre-stored identification data may be generated, e.g., when a user account is registered with a transaction system, an authentication system, or a transaction entity and the pre-stored identification may correspond to the transaction vehicle used for registration of the user account. Once the pre-stored identification data has been generated, it may be stored, e.g., with other user account information and/or authentication information, in one or more parts of a computer system (e.g., a computer system 110) and/or a user device. The pre-stored identification data may be stored, e.g., in one or more memory units, cookies, caches, browsing histories, and/or browser fingerprints. The pre-stored identification data may be stored, e.g., in a memory on-board the transaction vehicle. The pre-stored identification data may be distributed, e.g., over multiple devices or systems (e.g., peer-to-peer, cloud-computing based infrastructure, between the reader and an external device). In some embodiments, the pre-stored identification data of the user may be adjustable by the user. For instance, after the pre-stored identification data is stored, the user may update the pre-stored identification data during a pre-determined period. The pre-determined period may be at least 1 day, 1 week, 1 month, 1 quarter, 1 year or longer. In other embodiments, the pre-determined period may be at most 1 year, 1 quarter, 1 month, 1 week, 1 day or shorter.

Figure 3:
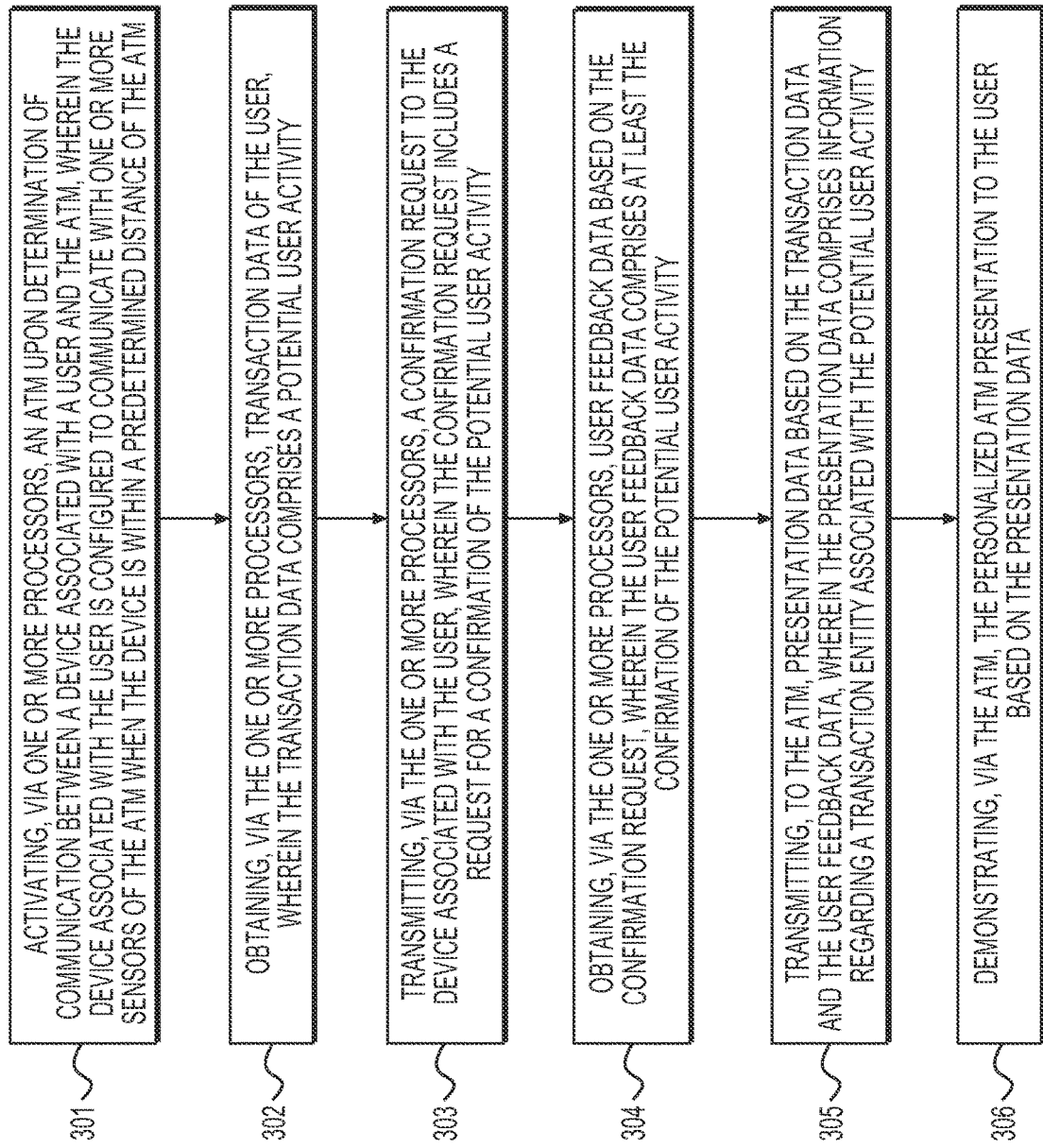
FIG. 3 depicts a flowchart of another exemplary method of demonstrating a personalized ATM presentation to a user, according to one or more embodiments.

FIG. 3 is a flowchart illustrating another exemplary method for demonstrating a personalized automated teller machine (ATM) presentation to a user, according to one or more embodiments of the present disclosure. The method may be performed by computer system 110. In some embodiments, some or all of the method may be performed by, e.g., a user device (e.g., a user device 150), and/or by an ATM.

Step 301 may include activating, via one or more processors, an ATM upon determination of communication between a device associated with the user (e.g., a user device) and the ATM. The device associated with the user may be configured to communicate with one or more sensors of the ATM when the device is within a pre-determined distance of the ATM. Such communication may include signal or data transmission between the ATM and the device associated with the user via a near-field communication (NFC), radio-frequency identification (RFID), or Bluetooth. Additionally or alternatively, the device associated with the user may be configured to communicate with the ATM, and vice versa, by a wired or wireless connection, such as a local area network, wide area network, cellular data network, or other network. Such communication may include signal or data transmission between the ATM and the user device over the network, optionally through a remote or local computer system associated with the ATM and/or the user device.

The ATM may be activated once the device associated with the user communicates with the ATM within a pre-determined distance of the ATM. When the ATM is activated, the ATM may change from a sleep mode (e.g., a lower electrical power mode where some of the components of the ATM are not working) to a work mode (e.g., a standard electrical power mode where all of the components of the ATM are working), or may change from an off-status (e.g., the ATM is completely turned off and does not consume any electrical power) to an on-status (e.g., the ATM is working and consumes standard electrical power). Such pre-determined distance may be set by the user or determined by an algorithm. The pre-determined distance of the user may be adjustable by the user or by an algorithm. For instance, after the pre-determined distance is stored, the user or an algorithm may update the pre-determined distance during a pre-determined period. The pre-determined period may be at least 1 day, 1 week, 1 month, 1 quarter, 1 year or longer. In other embodiments, the pre-determined period may be at most 1 year, 1 quarter, 1 month, 1 week, 1 day or shorter. The pre-determined distance of the user may be adjustable by the algorithm. Such algorithm may be a trained machine learning algorithm that can adjust the pre-determined distance of the user based on data received in the algorithm model 112. For instance, the trained machine learning algorithm may use previous pre-determined distances of the user, previous pre-determined distances of customers other than the user, previous geographic locations of the potential user activities, or previous geographic locations of the potential customer activities to train a machine learning algorithm. Details of the trained machine learning algorithm are described elsewhere herein. The pre-determined distance may be at least 1 meter ("m"), 2 m, 5 m, 8 m, 10 m, or longer. In some embodiments, the pre-determined distance may be at most 10 m, 8 m, 5 m, 3 m, 1 m, or shorter.

The one or more sensors of the ATM may include at least a proximity sensor. The one or more sensors may further include a radio-frequency identification tag, or a magnet to capture signals from the device associated with the user (e.g., user device), or the user.

The device associated with the user may include one or more transmitters configured to communicate with the one or more sensors. The device associated with the user may be the user device disclosed elsewhere herein, including a mobile device (e.g., smartphone, tablet, pager, personal digital assistant (PDA)), or a wearable device (e.g., smart watch). Further details of the device associated with the user are described elsewhere herein. The one or more transmitters may be configured to communicate with one or more sensors of the ATM via a short-range communication interface such as a near field communication (NFC) interface, Bluetooth, WiFi, or inter-integrated circuit (I2C) communication interfaces. The short-range communication interface may be used to engage short-range communication with other short-range communication enabled devices (e.g., an ATM).

After the ATM is activated, a notification may be sent to the device to notify the user that the ATM is activated. The notification may include any information associated with the ATM, including, but not limited to, the location of the ATM, the hours of the ATM, or the status of the ATM. The notification may be configured to be displayed on a display screen of a user device associated with the user (e.g., user device 150), either automatically, or in response to a prompt (e.g., a user-generated prompt or query). The notification may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor. In one example, the user may carry a user device and enter a grocery store having an ATM, and since the distance between the user and the ATM is within a pre-determined distance, the ATM can be activated and a notification may be sent to the user device to inform the user that the ATM is activated.

Step 302 may include obtaining, via the one or more processors, transaction data of the user. The transaction data may include, e.g., a potential user activity. The potential user activity may include an activity that may be potentially performed by the user via the ATM. The potential user activity may include, e.g., at least one of depositing funds, withdrawing funds, transferring funds, checking a balance, or changing identification data of the user. The potential user activity may include any transaction activity performed by the user via the ATM or not via the ATM. For instance, the potential user activity may include transferring funds from one financial account to another, sending funds to other customers or transaction entities, or dividing funds into different portfolios. The potential user activity may be obtained when user turns on the device associated with the user and access a third-party application provided by the transaction entity or associated with the ATM. In some embodiments, the potential user activity may be obtained when the ATM is activated. The transaction data may include identification data of the user. Details of the potential user activity and identification data are described elsewhere herein.

The step of obtaining the transaction data may be activated after the ATM is activated. In this situation, the transaction data of the user may be obtained automatically based on the trigger condition that the ATM is activated. For instance, the user may turn on an application on the user device to deposit funds to the user's financial account and enter a grocery store having an ATM, and the distance between the user holding the user device and the ATM is within a pre-determined distance. In this situation, the transaction data indicating that a potential user activity of depositing funds may be obtained automatically via the user device. In some embodiments, the transaction data of the user may be obtained based on the trigger conditions that the ATM is activated and user permits obtaining the transaction data. For instance, the user may turn on an application on the user device to withdraw funds from the user's financial account and may enter a grocery store having an ATM, and the distance between the user holding the user device and the ATM may be within a pre-determined distance. In this situation, the ATM can be activated and a notification may be sent to the user device to inform the user that the ATM is available for withdrawing funds, and the user may permit the ATM or the system to obtain transaction data via the device associated with the user.

Step 303 may include transmitting, via the one or more processors, a confirmation request to the device associated with the user. The confirmation request may include a request for a confirmation of the potential user activity. The confirmation request may include any information associated with the potential user activity, including, but not limited to, the description of the potential user activity, the time or location of the potential user activity, or identification data related to the potential user activity. The confirmation request may be configured, e.g., to be displayed on a display screen or output from a speaker of a user device associated with the user (e.g., user device 150). The confirmation request may be displayed on the display screen or output from a speaker in any suitable form, such as an e-mail, a text message, a push notification, content on a web page, any form of graphical user interface, a beep, ring, or other tone, a text-to-speech sentence read out loud, etc. The user device 150 may be capable of accepting inputs of a user via one or more interactive components of the user device 150, such as a keyboard, button, mouse, touchscreen, touchpad, joystick, trackball, camera, microphone, or motion sensor. For instance, the user may turn on an application on the user device to deposit funds to the user's financial account and enter a grocery store having an ATM, and the distance between the user and the ATM is within a pre-determined distance. In this situation, the transaction data indicating that a potential user activity of depositing funds may be obtained automatically. Then, a confirmation request including the description of potential user activity (e.g., depositing $500) may be presented on the display screen of the user device as a push notification, and the user may interact with the push notification to either confirm or decline such user activity.

Step 304 may include obtaining, via the one or more processors, user feedback data based on the confirmation request. In some embodiments, the user feedback data may include at least the confirmation or decline of the potential user activity. In some embodiments, the user feedback data may further indicate a user's preference of the ATM. For instance, if there are more than one ATM within the pre-determined distance, the user may be presented with a list of the ATMs via a display of the device associated with the user (e.g., user device 150), and the user feedback data may include at least one ATM selected by the user among the list of ATMs. In some embodiments, the user feedback data may be received and transmitted to a trained machine learning algorithm (e.g., neural network) to tune and/or update the trained machine learning algorithm towards user behavior or preference. In some embodiments, the user feedback data may be provided by the user via one or more interactive activities of the user with one or more interactive components of the user device. The one or more interactive activities may include clicking on or touching an image, link, or button displayed on a display of the device associated with the user. The device associated with the user may be capable of accepting inputs of a user via one or more interactive components of the user device, such as a keyboard, button, mouse, touchscreen, touchpad, joystick, trackball, camera, microphone, or motion sensor input (e.g., an input device 450 as described in connection with FIG. 4, below). One or more user interfaces (e.g., an app) may interact with the user to collect the user feedback data. For instance, the user may click on, touch, verbally indicate, or otherwise indicate one or more selections regarding the ATM displayed on a display of the user device. The one or more selections may be in the form of a link, button, hyperlink, list selection, image, or any other form. In one example, after a confirmation request including the description of potential user activity (e.g., depositing $500) is presented on the display screen of the user device as a push notification, the user may interact with the push notification to provide the user feedback data to confirm the potential user activity (e.g., depositing $500) and the selected ATM.

In some embodiments, the step of obtaining user feedback data may be based on motion, movement, or relocation of a user device (e.g., the user device 150) towards or into a geographic location, such as a geographic location of an ATM. For example, a user device may broadcast, transmit, detect, or indicate that it has moved into a geographic location of an ATM (e.g., either internally or via the network 130), which may serve to indicate the user's preference for that ATM. In some embodiments, a computer system (e.g., a computer system 110) remote from an ATM may receive such an indication, transmission, or broadcast from a user device. In some embodiments, a computer system local to an ATM, or an ATM itself, may receive such an indication, transmission, or broadcast from a user device.

Step 305, similar to step 205, may include transmitting, to the ATM, presentation data based on the transaction data and/or the user feedback data. Additionally or alternatively, step 305 may include simply loading, at the selected ATM, presentation data based on the transaction data and/or the user feedback data. Such presentation data may be stored locally at the selected ATM, or may be transmitted to the selected ATM from one or more local or remote computers. The presentation data may include, e.g., information regarding a transaction entity associated with the potential user activity. The information regarding the transaction entity may include, but is not limited to, a name, an identifier (e.g., bank identification number), a location, a trademark, a logo, a graphical display, or a characteristic of the transaction entity, or an audio or visual output associated with the transaction entity (e.g., an animation, a still image, or a noise such as a jingle, tune, or tone). The characteristic of the transaction entity may include, e.g., a branch number, a fee, a size (e.g., a number of customers), revenue, a net profit, an employee number, or any financial or product information related to the transaction entity. The transaction entity may include at least one of a financial services provider (e.g., a financial service provider 141) or another third-party entity (e.g., a third-party entity 142, such as, an on-line resource, or a merchant. Details of the financial services provider, or other third-party entity are described elsewhere herein. Prior to step 305, or at any stage of demonstrating a personalized ATM presentation to a user, the method may include determining the presentation data based on transaction data (e.g., identification data) of the user. Further details of the presentation data and determining the presentation data are described elsewhere herein.

Step 306, similar to step 206, may include demonstrating, via the ATM, the personalized ATM presentation to the user based on the presentation data. The personalized ATM presentation includes at least one of a logo or a theme associated with the transaction entity. The personalized ATM presentation may include at least a design, a layout, a graphic scheme, or a color scheme of the personalized ATM presentation. The demonstrating the personalized ATM presentation to the user based on the presentation data may include receiving such presentation from the transaction entity, thus the presentation data may be provided by the transaction entity. Details of the design, layout, graphic scheme, or color scheme of the personalized ATM presentation are described elsewhere herein. In some embodiments, the personalized ATM presentation may be customized to allow for ease of performing a potential activity confirmed earlier by the user (e.g., withdrawal or depositing of cash, transferring funds, checking a balance, etc.).

In some embodiments, the step of demonstrating the personalized ATM presentation to the user may include demonstrating the personalized ATM presentation via an augmented reality (AR) device or a virtual reality (VR) device. The AR device may include a wearable glass device or a head-mounted device which, in some cases, may include or may be part of a user device. The VR device may include, e.g., a virtual reality headset, which may be a head-mounted device that provides virtual reality for the wearer. The AR device or VR device may include, e.g., a stereoscopic head-mounted display (providing separate images for each eye), stereo sound, head motion tracking sensors (e.g., which may include gyroscopes, accelerometers, magnetometers, structured light systems, etc.), and/or eye tracking sensors. The AR device or the VR device may be equipped by the user. The AR device or the VR device may include one or more processors or components (e.g., sensors) that are able to communicate with the ATM (and/or a user device, if the AR or VR device does not include a user device). Such communication may be initiated once the personalized ATM presentation is generated, or once the presentation data is determined. Such communication may be available, e.g., when the distance between the user and the ATM is within a pre-determined distance. Such pre-determined distance may be at least 5 meters, 10 meters, 20 meters, 30 meters, 40 meters or more. In some embodiments, the pre-determined distance may be at most 40 meters, 30 meters, 20 meters, 10 meters, 5 meters, or less. In one example, an ATM may be activated because the user holding the user device is within a pre-determined distance of the ATM, and after user confirms the potential user activity with the ATM, one or more components of the ATM may provide signal or data that can communicate with the one or more processors or components of the VR device to activate the VR device. In this situation, the user may see a personalized ATM presentation of the ATM via the VR device that the user is wearing. In some embodiments, the personalized presentation may persist for a pre-determined period of time when the user is within the pre-determined distance, either when the user wears an AR/VR device or not. Such pre-determined period of time may be at least 30 seconds, 1 minute, 2 minutes, 5 minutes, 10 minutes, or longer. In some embodiments, the pre-determined period of time may be at most 10 minutes, 5 minutes, 2 minutes, 1 minute, 30 seconds, or shorter.

At any stage of demonstrating a personalized automated teller machine (ATM) presentation to a user (e.g., step 304), a trained machine learning algorithm may be used. The trained machine learning algorithm may be part of the analysis model 112. The trained machine learning algorithm may include, e.g., a regression-based model that accepts the transaction data, geographic data, ATM data, user feedback data, or presentation data as input data. The trained machine learning algorithm may be of any suitable form, and may include, for example, a neural network. A neural network may include software representing human neural system (e.g., cognitive system). A neural network may, e.g., include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer based on the relative weight of connections between input neurons and neurons in the first internal layer. A neural network may include any suitable type of network, such as a convolutional neural network, a deep neural network, or a recurrent neural network.

The trained machine learning algorithm may compute the future presentation data, future transaction data (e.g., potential user activity), or future user feedback data of the user as a function of the prior transaction data, prior geographic data, prior ATM data, prior user feedback data, prior presentation data, or one or more variables indicated in the input data. The one or more variables may be derived from the prior transaction data, prior geographic data, prior ATM data, prior user feedback data, or prior presentation data. This function may be learned by training the machine learning algorithm with training sets.

The machine learning algorithm may be trained by supervised, unsupervised or semi-supervised learning using training sets comprising data of types similar to the type of data used as the model input. For example, the training set used to train the model may include any combination of the following: prior transaction data of the user, prior geographic data of the user, prior user feedback data, prior ATM data of the user, prior presentation data of the user, prior transaction data of customers other than the user, prior geographic data of customers other than the user, prior feedback data of customers other than the user, prior ATM data of customers other than the user, and/or prior presentation data of customers other than the user. Accordingly, the machine learning model may be trained to map input variables to a quantity or value of the future presentation data, future transaction data (e.g., potential user activity), or future user feedback data of the user. That is, the machine learning model may be trained to determine a quantity or value of the future presentation data, future transaction data (e.g., potential user activity), or future user feedback data of the user as a function of various input variables.

In general, any process discussed in this disclosure that is understood to be computer-implementable, such as the processes illustrated in FIGS. 2-3, may be performed by one or more processors of a computer system, such as the computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Further, while particular processes have been outlined herein, it is contemplated that such processes are exemplary. A person skilled in the art will understand that variations on such processes, including repeating, re-ordering, adding, or deleting steps are well within the purview of one of ordinary skill in the art, and are contemplated by this disclosure as well.

A computer system, such as the computer system 110, the ATM 160, and/or the user device 150, may include one or more computing devices. If the one or more processors of the computer system 110, the ATM 160, and/or the user device 150 are implemented as a plurality of processors, the plurality of processors may be included in a single computing device or distributed among a plurality of computing devices. If a computer system 110, the ATM 160, and/or the user device 150 comprises a plurality of computing devices, the memory of the computer system 110, the ATM 160, and/or the user device 150 may include the respective memory of each computing device of the plurality of computing devices.

Figure 4:
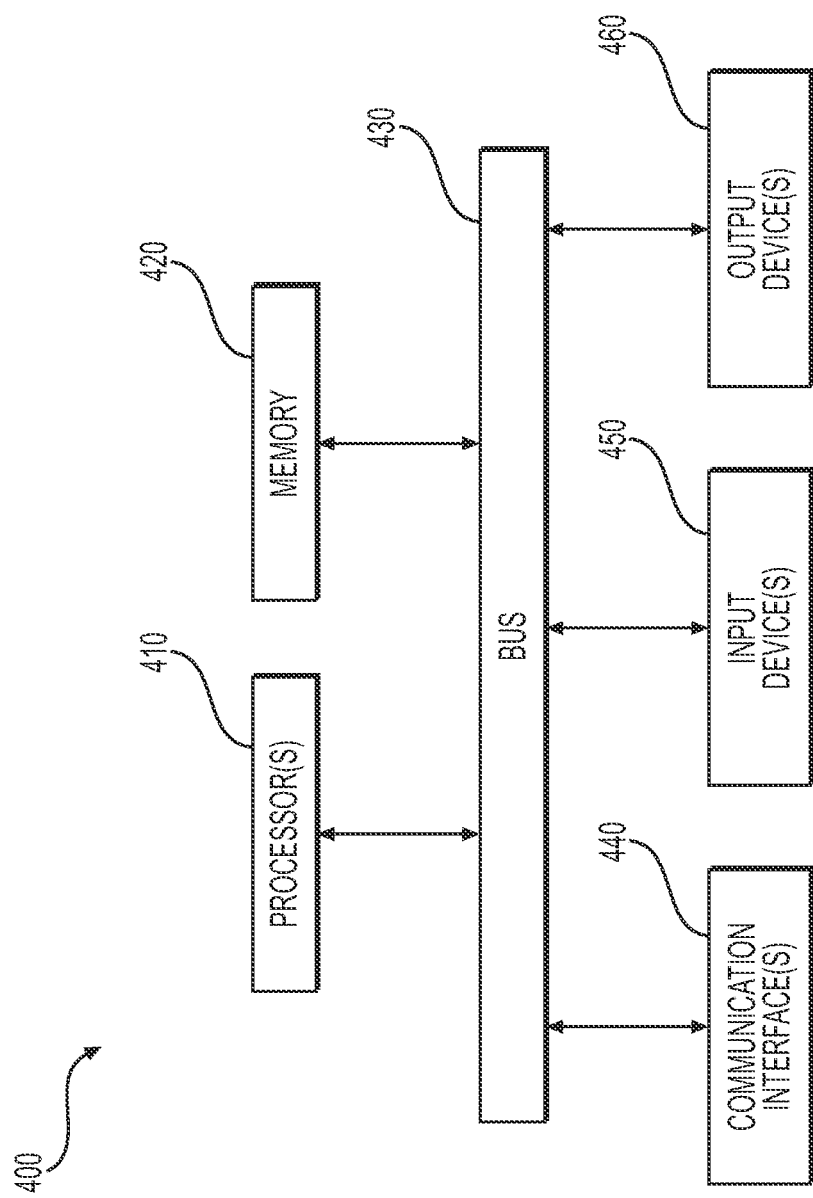
FIG. 4 depicts an example of a computing device, according to one or more embodiments.

FIG. 4 illustrates an example of a computing device 400 of a computer system, such as the computer system 110 and/or the user device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as an embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added to, deleted from, and/or repeated within methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for demonstrating a personalized automated teller machine (ATM) presentation to a user, the method comprising:
    obtaining, at a server system, previous transaction data of the user;
    predicting, based on the obtained previous transaction data, a future geographic location of one or more of the user or an activity to be performed by the user;
    causing an ATM associated within the predicted future geographic location to obtain presentation data that includes information regarding a transaction entity associated with the user; and
    causing at least one display associated with the ATM to demonstrate the personalized ATM presentation to the user based on the presentation data.

2. The computer-implemented method of claim 1, wherein the previous transaction data includes a time and a location of one or more previous transactions by the user.

3. The computer-implemented method of claim 2, wherein the future geographic location is predicted within a predetermined radius of one or more locations from the one or more previous transactions.

4. The computer-implemented method of claim 2, further comprising:
predicting a future time of one or more of a presence of the user at the future geographic location or an occurrence of the activity to be performed by the user;
wherein the causing of the at least one display associated with the ATM to demonstrate the personalized ATM presentation to the user is performed with reference to the predicted future time.

5. The computer-implemented method of claim 2, wherein the location of one or more previous transactions by the user is determined by obtaining historical positioning data from a user device of the user corresponding to the time of the one or more previous transactions by the user.

6. The computer-implemented method of claim 1, wherein causing the at least one display associated with the ATM to demonstrate the personalized ATM presentation is performed in response to determining that the user has entered within a predetermined radius of the ATM.

7. The computer-implemented method of claim 1, wherein the activity includes an activity able to be performed by the user via the ATM.

8. The computer-implemented method of claim 1, wherein the activity includes procuring or providing a good or service.

9. The computer-implemented method of claim 1, wherein the personalized ATM presentation includes at least one of a logo or a theme associated with the transaction entity.

10. The computer-implemented method of claim 1, wherein the transaction entity includes at least one of a financial services provider, an on-line resource, or a merchant.

11. A system for demonstrating a personalized automated teller machine (ATM) presentation to a user, comprising:
at least one memory storing instructions; and
at least one processor operatively connected to the at least one memory and configured to execute the instructions to perform operations, including:
obtaining previous transaction data of the user;
predicting, based on the obtained previous transaction data, a future geographic location of one or more of the user or an activity to be performed by the user;
causing an ATM associated within the predicted future geographic location to obtain presentation data that includes information regarding a transaction entity associated with the user; and
causing at least one display associated with the ATM to demonstrate the personalized ATM presentation to the user based on the presentation data.

12. The system of claim 11, wherein the previous transaction data includes a time and a location of one or more previous transactions by the user.

13. The system of claim 12, wherein the future geographic location is predicted within a predetermined radius of one or more locations from the one or more previous transactions.

14. The system of claim 12, further comprising:
predicting a future time of one or more of a presence of the user at the future geographic location or an occurrence of the activity to be performed by the user;
wherein the causing of the at least one display associated with the ATM to demonstrate the personalized ATM presentation to the user is performed with reference to the predicted future time.

15. The system of claim 12, wherein the location of one or more previous transactions by the user is determined by obtaining historical positioning data from a user device of the user corresponding to the time of the one or more previous transactions by the user.

16. The system of claim 11, wherein causing the at least one display associated with the ATM to demonstrate the personalized ATM presentation is performed in response to determining that the user has entered within a predetermined radius of the ATM.

17. The system of claim 11, wherein the activity includes an activity able to be performed by the user via the ATM or procuring or providing a good or service.

18. The system of claim 11, wherein the personalized ATM presentation includes at least one of a logo or a theme associated with the transaction entity.

19. The system of claim 11, wherein the transaction entity includes at least one of a financial services provider, an on-line resource, or a merchant.

20. A non-transitory computer-readable medium comprising instructions for demonstrating a personalized automated teller machine (ATM) presentation to a user that are executable by at least one processor to perform operations, including:
obtaining previous transaction data of the user, wherein the previous transaction data includes a time and a location of one or more previous transactions by the user;
predicting, based on the obtained previous transaction data, a future geographic location of one or more of the user or an activity to be performed by the user, wherein the future geographic location is predicted within a predetermined radius of one or more locations from the one or more previous transactions;
predicting a future time of one or more of a presence of the user at the future geographic location or an occurrence of the activity to be performed by the user;
causing an ATM associated within the predicted future geographic location to obtain presentation data that includes information regarding a transaction entity associated with the user; and
with reference to the predicted future time, causing at least one display associated with the ATM to demonstrate the personalized ATM presentation to the user based on the presentation data.

* * * * *